United States Patent [19]

Murata

[11] Patent Number: 5,504,574
[45] Date of Patent: Apr. 2, 1996

[54] MEASURING APPARATUS FOR ADJUSTING OPTICAL AXIS OF HEADLIGHT AND METHOD OF ADJUSTING OPTICAL AXIS

[75] Inventor: Nagatoshi Murata, Sayama, Japan

[73] Assignee: Honda Giken Kogyo Kabushiki Kaisha, Tokyo, Japan

[21] Appl. No.: 362,001

[22] Filed: Dec. 22, 1994

[30] Foreign Application Priority Data

Dec. 28, 1993 [JP] Japan .................................. 5-334784
Sep. 1, 1994 [JP] Japan .................................. 6-208879

[51] Int. Cl.⁶ .................................................. G01M 11/06
[52] U.S. Cl. ................................................................ 356/121
[58] Field of Search ................................. 356/121; 33/288

[56] References Cited

U.S. PATENT DOCUMENTS

| | | | |
|---|---|---|---|
| 5,056,916 | 10/1991 | Kikuchi et al. | 356/121 |
| 5,164,785 | 11/1992 | Hopkins et al. | 356/121 |
| 5,210,589 | 5/1993 | Kaya et al. | 356/121 |

FOREIGN PATENT DOCUMENTS

| | | |
|---|---|---|
| 0296856 | 12/1988 | European Pat. Off. . |
| 2-9298 | 3/1990 | Japan . |
| 3-103743 | 4/1991 | Japan . |
| 2248679 | 3/1992 | United Kingdom . |

*Primary Examiner*—F. L. Evans
*Attorney, Agent, or Firm*—Armstrong, Westerman, Hattori, McLeland & Naughton

[57] ABSTRACT

An illuminating pattern to appear on a first screen which is disposed in front of a headlight is pictured by a camera. A light-shielding panel is disposed on substantially the same plane as the first screen. A pin hole is formed in the light-shielding panel. The light to penetrate through the pin hole is illuminated via a mirror on a second screen which is on a surface behind the light-shielding panel. On the second screen there is formed an imaginary light source image which is to be formed on a reflecting light of the headlight. This image is pictured by the camera together with an illuminating pattern on the first screen. From the position of the imaginary light source image the actual position of the headlight is located, and the position of an acceptable range, within which a reference measuring point inside the illuminating pattern falls, is corrected depending on the position of the headlight so that the reference measuring point may fall within the acceptable range. Since the shape of the imaginary light source image varies with the orientation of the optical axis, the optical axis may also be adjusted such that the imaginary light source image becomes a normal shape.

7 Claims, 3 Drawing Sheets

MEASURING APPARATUS FOR ADJUSTING OPTICAL AXIS OF HEADLIGHT AND METHOD OF ADJUSTING OPTICAL AXIS

BACKGROUND OF THE INVENTION

1. Field of the Invention

The present invention relates to a measuring apparatus to be used in a step of adjusting an optical axis of a headlight of a vehicle such as a motor vehicle, as well as to a method of adjusting the optical axis by using this measuring apparatus.

2. Description of Related Art

As a method of adjusting the optical axis of a headlight, there has hitherto been known the following. Namely, a light from a headlight is projected to, or illuminated on, a screen which is disposed in front of the headlight. That illuminating pattern of the headlight which appears on the screen is pictured by a camera. Then, the optical axis of the headlight is adjusted such that a measuring reference point, which is measured by image processing from the illuminating pattern and which has a certain correlation with the optical axis of the headlight, falls within a predetermined acceptable range (see Japanese Published Examined Patent Application No. 9298/1990 and Japanese Published Unexamined Patent Application No. 103743/1991).

The measuring reference point is set in various manners. For example, a center of gravity of a range of illuminance above a predetermined value within the illuminating pattern is set in some cases as the measuring reference point and, in the case of a cutoff type of headlight, an elbow point which is the crossing point of a horizontal portion and an inclined portion of a cutoff line (i.e., a border line between a light portion and a dark portion) is used as the measuring reference point.

In the above-described prior art, an assumption is made that the headlight is present in a predetermined set position. That acceptable range on the screen within which the measuring reference point is to be positioned is determined by the above-described setting position, a normal direction or orientation of the optical axis and a distance to the screen. However, there are cases where the actual position of the headlight deviates from the set position due to an initial running-in or break-in period of suspension members, variation in air pressure in pneumatic tires, assembly errors, or the like. In such a case, even if the orientation of the optical axis deviates from the normal orientation, the measuring reference point may fall within the acceptable range, with the result that an exact adjustment of the optical axis can no longer be made.

In order to solve this kind of disadvantage, the following method is known in Japanese Published Unexamined Patent Application No. 147030/1992 (corresponding to U.S. patent application Ser. No. 08/031,468) by the inventors inclusive of the inventor of the present invention. Namely, in front of a headlight there is disposed a lattice member which has a plurality of longitudinally elongated lattice holes arranged into matrix. A light beam to be transmitted through the lattice holes is projected to the screen. The illuminating area and the illuminance of the transmitted light through the lattice holes at each of the illuminating regions which are divided into matrix by each of the lattice holes are then measured in order to adjust the optical axis of the headlight. According to this method, there is an advantage in that the position of the light source and the direction or orientation of the optical axis can be accurately measured. On the other hand, there is a disadvantage in that the image processing must be carried out for each of the large number of illuminating regions that are divided into matrix, with the result that the processing is time-consuming and that a cycle time for adjusting the optical axis becomes long.

By the way, the headlight is so arranged that a light beam from a filament, which is the actual light source, is projected forwards through reflection by a reflecting mirror. It can therefore be regarded that the light beam is projected forwards from an imaginary light source on the reflecting mirror. When the headlight in a lighted condition is looked at from the front side with the viewer's eyes half-closed, both the left and the right side portions inside the headlight can be seen bright. These bright portions are considered to represent images of the imaginary light source on the reflecting mirror. When the headlight is looked at from a predetermined position in front of the headlight, the images of the imaginary light source also vary with the change in the position of the headlight.

In view of the above-described finding, the present invention has an object of providing a measuring apparatus in which not only the optical axis of the headlight but also the position of the headlight can be accurately measured in a short time, as well as providing a method of adjusting the optical axis by using this apparatus.

SUMMARY OF THE INVENTION

In order to attain the above and other objects, the present invention is a measuring apparatus for adjusting an optical axis of a headlight comprising: a first screen disposed in front of the headlight; a camera for picturing an illuminating pattern which appears on the first screen; and an image sensing means for sensing that image of an imaginary light source which is formed on a reflecting mirror of the headlight.

A first method of adjusting an optical axis of a headlight according to the present invention comprises the steps of: measuring a position of the headlight from a position of an imaginary light source image which is sensed by the image sensing means; correcting an acceptable range within which falls a measuring reference point which is measured by an illuminating pattern on the first screen and which has a certain correlation with the optical axis of the headlight; and adjusting the optical axis such that the measuring reference point falls within the acceptable range.

A second method of adjusting an optical axis of a headlight according to the present invention comprises the steps of: measuring a position of the headlight from a position of an imaginary light source image which is sensed by the image sensing means; correcting an acceptable range within which falls a measuring reference point which is measured by an illuminating pattern on the first screen and which has a certain correlation with the optical axis of the headlight; roughly adjusting the optical axis of the headlight such that the measuring reference point falls within a target range; and finely adjusting the optical axis of the headlight such that the imaginary light source image becomes a normal shape.

A third method of adjusting an optical axis of a headlight according to the present invention comprises the steps of: sensing by the image sensing means that image of an imaginary light source which is formed on a reflecting mirror of the headlight; and adjusting the optical axis of the headlight such that the imaginary light source image becomes a normal shape.

The imaginary light source image to be sensed by the image sensing means varies with the position of the headlight. Therefore, the actual position of the headlight can be measured by the position of the imaginary light source image. As in the above-described first method of adjusting the optical axis, by correcting the acceptable range depending on the position of the headlight, and by adjusting the optical axis such that the measuring reference point falls within this acceptable range, accurate adjustment of the optical axis can be carried out so as to attain a normal orientation of the optical axis even if the position of the headlight may deviate from a set position.

Further, the imaginary light source image varies in shape with the orientation of the optical axis of the headlight. If the shape of the imaginary light source image when the optical axis is in the normal orientation is measured in advance and is stored in memory as the normal shape and, as described above in the third method of adjusting the optical axis, if the optical axis is adjusted such that the imaginary light source image coincides with the normal shape, an accurate adjustment of the optical axis can be made such that the optical axis attains the normal orientation.

When the orientation of the optical axis largely deviates, the shape of the imaginary light source image distorts and, consequently, the orientation of the optical axis will no longer be determined. In this case, as in the above-described second method of adjusting the optical axis, if a rough adjustment is made such that the measuring reference point falls within the approximate target range, a large deviation of the optical axis can be corrected. Thus, it becomes possible to judge the orientation of the optical axis from the shape of the imaginary light source image. Therefore, the adjustment of the optical axis can thereafter be made in the same manner as in the third method of adjusting the optical axis.

The imaginary light source image is of a simple shape and, therefore, the position and the shape thereof can be easily measured at a short time. The cycle time for adjusting the optical axis can thus be shortened.

By the way, the imaginary light source image can be pictured or sensed by largely restricting or gathering the light from the headlight. For example, the imaginary light source image can be pictured by adding or mounting a dark-color filter on the camera and also by throttling the camera. However, if the imaginary light source image is directly pictured by the camera, the accuracy of measuring the position of the headlight based on the position of the imaginary light source image can hardly be improved because the position of the imaginary light source image on the screen of the camera does not vary so much even when the headlight is deviated.

On the other hand, if a light-shielding panel is disposed in front of the headlight and a pin hole is formed in the panel so that the light penetrated through the pin hole is projected to a second screen which is provided separately from the first screen for the illuminating pattern, the imaginary light source image is formed on the second screen in the same principle as the pin hole camera. This imaginary light source image largely deviates depending on the deviation of the headlight through the function of an optical lever with the pin hole functioning as the fulcrum. Therefore, the accuracy of measuring the position of the headlight based on the position of the imaginary light source image can be easily improved.

In this case, as the device for sensing the image on the second screen, a camera may be used. It is however possible to constitute the second screen itself by that image-forming surface like the image-forming surface of the camera which is made by an array of light-receiving elements such as CCD elements.

In order to effectively obtain the above-described optical lever function, it is preferable to retain a large length of the optical path from the pin hole to the second screen. In this case, if the second screen is disposed on a surface behind the light-shielding panel such that the light penetrating through the pin hole of the light-shielding panel is projected on the second screen after reflection on a mirror, a large length of light path can advantageously be secured without enlarging the longitudinal (i.e., front-to-back) length of the measuring apparatus. Further, if the first screen is constituted by the translucent panel which is disposed on substantially the same plane as the light-shielding panel, and the camera is disposed behind the first screen such that both the first screen and the second screen fall within the field of view of the camera, the camera for illuminating pattern can be used for the dual purpose of the camera for picturing the imaginary light source image. Therefore, the number of cameras to be used can advantageously be reduced.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
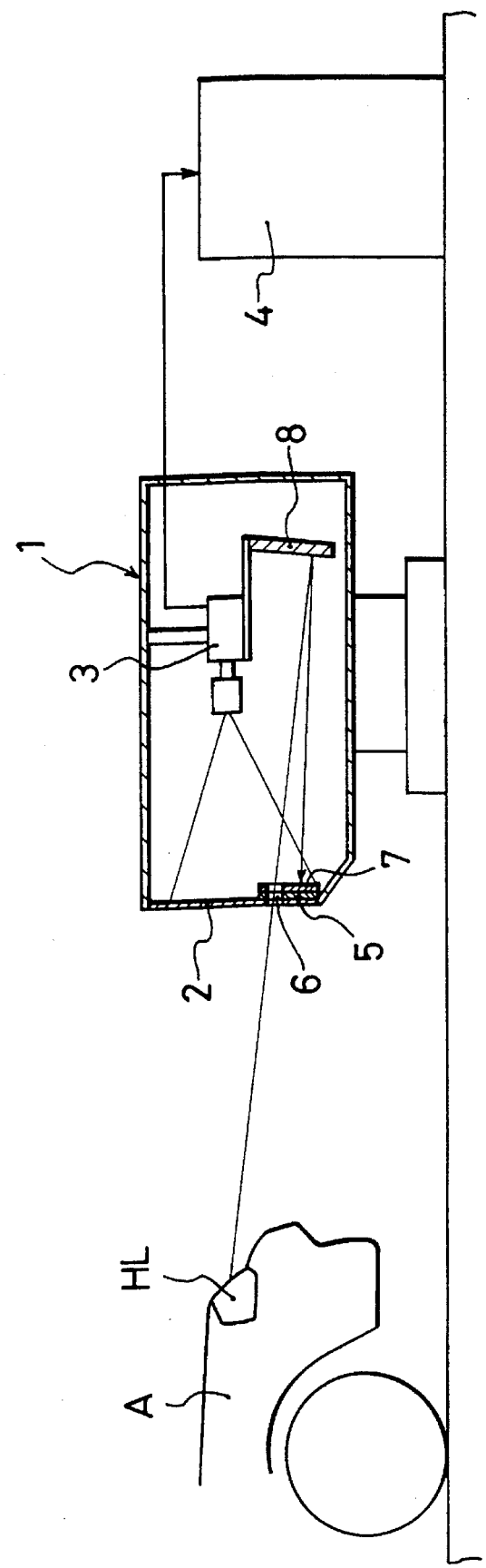
FIG. 1 is a sectional side view of one example of a measuring apparatus according to the present invention.

FIG. 1 shows a measuring apparatus to be used in the process of adjusting an optical axis of a headlight HL of a motor vehicle A. This measuring apparatus is provided with an apparatus main body 1 of box shape, a semitransparent or translucent first screen 2 comprising a piece of frosted glass or the like which is mounted in that opening on the front side of the apparatus main body 1 which faces the headlight HL, and a CCD camera 3 which is contained in the apparatus main body 1 and which is positioned behind the first screen 2. After the motor vehicle A is stopped in a certain fixed position in which the distance between the headlight HL and the front of the apparatus main body 1 becomes a predetermined value (e.g., 3 m), the headlight HL is switched on. The illuminating pattern which appears on the first screen 2 is pictured or image-sensed by the camera 3, and the image data are transmitted to an image processing apparatus 4, thereby measuring the optical axis of the headlight HL.

In the above-described front opening of the apparatus main body 1, there is mounted an oblong light-shielding panel 5 which is located on a surface behind the lower portion of the first screen 2. There is provided a pin hole 6 in that laterally central position of the light-shielding panel 5 which is laterally in the same position as the headlight HL. On a surface behind the light-shielding panel 5 there is provided a second screen 7. On both the first screen 2 and the second screen 7 there is respectively provided a through-going hole which coincides with the pin hole 6. Inside the apparatus main body 1 there is provided a mirror 8 which reflects the light transmitted through the pin hole 6 towards the second screen 7. The shape of the pin hole 6 may be arbitrarily decided to a square one, a circular one or the like, but the area of the opening of the pin hole 6 must be below about 150 mm². According to this arrangement, the light from the headlight HL is restricted by, or gathered at, the pin hole 6 and is projected to the second screen 7 via the mirror 8. Therefore, like at the time when the headlight is looked at with the viewer's eyes half-closed, there will appear on the second screen 7 an image of the imaginary light source on the reflecting mirror of the headlight HL. If the area of the opening of the pin hole 6 is made smaller, the image of the imaginary light source becomes dark. In order to form a brighter and clearer image of the imaginary light source, it is preferable to make the area of the opening of the pin hole 6 to be about 90 mm².

The above-described CCD camera 3 is disposed such that the second screen 7 also falls inside the field of vision thereof. In this manner, a picturing means that can picture or sense the image of the imaginary light source on the reflecting mirror can be constituted by the pin hole 6, the mirror 8, the second screen 7 and the camera 3.

Figure 2:
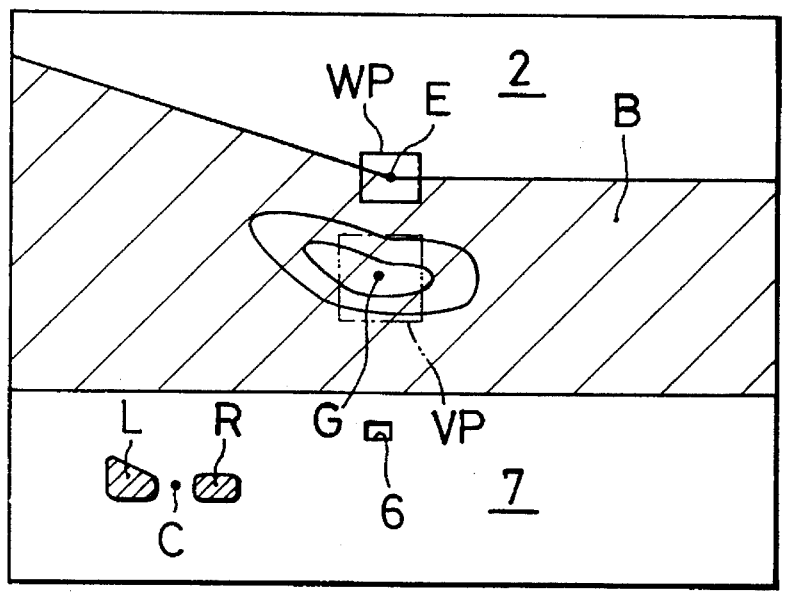
FIG. 2 is a diagram showing an image formed at the time of illuminating a cutoff type of headlight.

By the way, there are various kinds in the headlight HL. For example, in the case of the cutoff type of headlight for a motor vehicle designed to run on the right-hand side of the road (hereinafter called a keep-to-right motor vehicle), there will appear, as shown in FIG. 2, that illuminating pattern B on the first screen 2 which has a cutoff line (i.e., a border line between a bright portion and a dark portion) inclined upwards towards the left. In this manner, there will appear on the second screen 7 two left and right imaginary light source images L, R. In this embodying example, the mirror 8 is laterally inclined so that the imaginary light source images L, R are formed in a position which is offset sidewise from the pin hole 6. The image on the second screen 7 will be the one, like in a pin hole camera, which is reversed both in the vertical and horizontal directions.

The above-described cutoff type of headlight cuts the light beam which, as seen from the front side towards the headlight, is reflected at the lower left side and is directed towards the upward right direction. Therefore, there is provided a light-shielding member at the lower left side of a filament which is the actual light source to thereby prevent the light beam from becoming incident on the lower left side portion of the reflecting mirror. As a result, that imaginary light source image R on the right side which corresponds to the imaginary light source on the left side position of the reflecting mirror will become an approximately rectangular small image. That imaginary light source image L on the left side which corresponds to the imaginary light source on the right side portion of the reflecting mirror will become an approximately trapezoidal large image. In the case of the cutoff type of headlight for a motor vehicle designed to run on the left-hand side of the road (hereinafter called a keep-to-left motor vehicle), the illuminating pattern on the first screen 2 will be one which has a cutoff line inclined upwards towards the right. The imaginary light source images on the right side and the left side of the second screen 7 will be, contrary to the above-described one, approximately trapezoidal on the right hand side and approximately rectangular on the left side.

Figure 3:
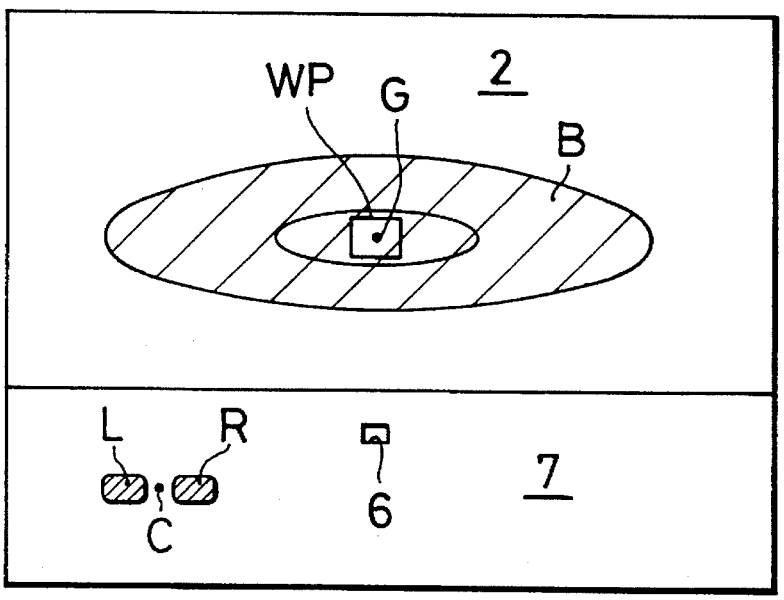
FIG. 3 is a diagram showing an image formed at the time of illuminating a spotlight type of headlight.

Further, in the case of a spotlight type of headlight, there will appear on the first screen 2 an elliptical illuminating pattern which is long from side to side as shown in FIG. 3. On the second screen 7 there will appear two left and right imaginary light source images L, R which are both oblong and are of the same size.

The imaginary light source images L, R in FIGS. 2 and 3 show a condition in which they are binarized by a predetermined threshold values by means of the image processing apparatus 4.

In adjusting the optical axis of the headlight HL, the type of the headlight HL is first determined based on the shape of the binarized imaginary light source image. Namely, if the imaginary light source image L on the left side is trapezoidal, it is judged to be the cutoff type of headlight for the keep-to-right motor vehicle. If the imaginary light source image R on the right side is trapezoidal, it is judged to be the cutoff type of headlight for the keep-to-left motor vehicle. If the imaginary light source images L, R on the right and the left sides are both rectangular, it is judged to be the spotlight type of headlight. In this case, if the optical axis of the headlight is deviated in the right or left direction, the ratio of the sizes of the right and the left imaginary light source images varies. If the optical axis is deviated to the vertical direction, each of the imaginary light source images L, R will be in a shape compressed in the vertical direction. Nevertheless, the basic shape of the image such as a trapezoid and an oblong will be maintained and, therefore, the type of the headlight HL can be determined or recognized from the shape of the imaginary light source images L, R even before the adjustment of the optical axis.

Next, the position of a middle point C of the respective centers of gravity of the left and right imaginary light source images L, R is measured as the point to correspond to the actual light source of the headlight HL. A comparison is made between the reference point in which the middle point C is positioned when the headlight HL is present in a predetermined set position relative to the measuring apparatus, and the position of the measured middle point C. A deviation of the headlight HL off the set position is thus obtained.

Thereafter, there is set on the first screen 2 an acceptable range WP depending on the kind of the headlight that has earlier been determined. At this time, the position of the acceptable range WP is corrected depending on the deviation in position of the headlight as obtained in the manner described above. For example, when the middle point C is deviated in the right downward direction off the reference position, it follows that the position of the headlight HL is deviated in the left upward direction off the set position. Therefore, the acceptable range WP is moved towards the left upward direction.

Here, the acceptable range WP is to be set as a range within which falls the measuring reference point which is measured by the illuminating pattern B and which has a certain correlation with the optical axis. As this measuring reference point, the elbow point E which is the crossing point between the horizontal portion and the inclined portion of the cutoff line is used in the case of the cutoff type of headlight and, in the case of the spotlight type of headlight, the point of the highest illuminance in the illuminating pattern or a center of gravity G of a range of illuminance above a predetermined value is used. Then, the illuminating pattern B on the first screen 2 is image-processed to measure the position of the elbow point E or the center of gravity G. A comparison is made between this point E, G and the acceptable range WP to calculate the angle of deviation of the optical axis, and an adjustment is made so that the point E, G falls within the acceptable range WP.

It is possible to thus carry out the adjustment of the optical axis in a single time but, in order to enhance the adjustment accuracy, it is preferable to carry out the measurement of the position of the headlight once again by means of the imaginary light source images L, R, the adjustment of the position of the acceptable range WP, and the adjustment of the optical axis.

It is not always easy to measure by unambiguously locating that elbow point E within the illuminating pattern B which is the measuring reference point in the cutoff type of headlight. Therefore, the adjustment of the optical axis based on the elbow point E may sometimes give rise to a dispersion in accuracy.

Figure 4D:
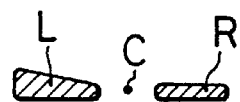
FIGS. 4A through 4E are diagrams showing changes in shapes of imaginary light source images depending on changes in an optical axis.
Figure 4B:
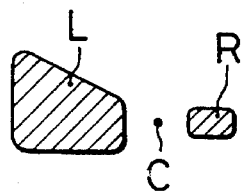
Figure 4A:
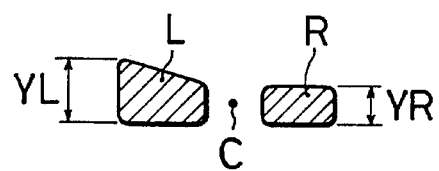
Figure 4C:
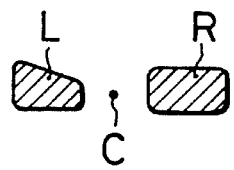
Figure 4E:
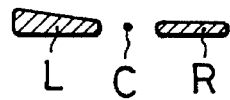

By the way, the left and right imaginary light source images L, R of the cutoff type of headlight vary or deform as shown in FIGS. 4A through 4E depending on the orientation of the optical axis. In other words, when the optical axis is in the ordinary or normal orientation, both the imaginary light source images L, R will be as shown in FIG. 4A. When the optical axis deviates to the left as seen from the front side, the area SL of the left side imaginary light source image L increases and, at the same time, the area SR of the right side imaginary light source image R decreases as shown in FIG. 4B. When the optical axis deviates to the right, the area of the left side imaginary light source image L decreases and, at the same time, the area of the right side imaginary light source image R increases as shown in FIG. 4C. When the optical axis deviates upwards or downwards, the widths YL, YR of the left and right imaginary light source images L, R in the vertical direction become smaller as shown in FIGS. 4D and 4E, respectively. Therefore, the optical axis can also be adjusted to the normal orientation by making an adjustment such that the shapes of the left and right imaginary light source images L, R become normal shapes as shown in FIG. 4A on the basis of the shapes of the left and right imaginary light source images L, R. In this case, it is necessary to detect the direction of deviation of the left and right imaginary light source images L, R before carrying out the adjustment of the optical axis. However, since both the imaginary light source images L, R become vertically compressed in the vertical direction when the optical axis deviates upwards or downwards, it becomes difficult to detect in which of the upward and downward directions the optical axis is deviated. Further, when the optical axis is largely deviated to the left or right, the imaginary light source images are merged into one and, therefore, it becomes difficult also in such a case to detect in which of the left and right directions the optical axis is deviated.

As a solution, as shown by an imaginary line in FIG. 2, there is set on the first screen 2 an approximate target range VP inside which should fall the measuring reference point within the illuminating pattern B. The optical axis is roughly adjusted so that the measuring reference point falls inside the target range VP. Then, fine adjustments are made such that the left and right imaginary light source images L, R become normal shapes, i.e., such that the area SL and the vertical width YL of the imaginary light source image L on the left side and the area SR and the vertical width YR of the imaginary light source image R on the right side meet the following formulas $$SL/SR = a \quad (1)$$

$$YL = b \quad (2)$$

$$YR = c \quad (3)$$

where a, b, and c are constants to be obtained from the normal shapes. In this case, as the measuring reference point, there is used the center of gravity G which is within an illuminance range above a predetermined value and which can be unambiguously located. Further, the position of the target range VP is corrected depending on that positional deviation of the headlight HL which can be obtained by the middle point of both the imaginary light source images L, R.

In the spotlight type of headlight, it is also possible to adjust the optical axis based on the shapes of the left and right imaginary light source images L, R. In this case, the constants a, b and c in the above-described formulas (1) through (3) are changed to the values which correspond to the normal shapes of both the left and right imaginary light source images L, R of the spotlight type of headlight. Further, depending on the type of the headlight, there are cases where the imaginary light source images to be formed on the second screen 7 do not separate from each other but will appear as a merged one (e.g., in a projector type of headlight). In such a case, the center of gravity of the imaginary light source image is obtained, a rough adjustment is made by using it as the position of the headlight, and fine adjustments are made so that the area, the vertical width, and the lateral width of the imaginary light source image respectively become predetermined values.

The adjustment of the optical axis is made in an automated manner by controlling an unillustrated servo driver unit intended for the adjustment of the optical axis, based on the above-described processed results by means of the image processing apparatus 4. This adjustment may also be made by displaying the processed results on a display device such as a CRT or the like in a manual mode while looking at the display device.

It is readily apparent that the above-described measuring apparatus for adjusting the optical axis of a headlight and a method of adjusting the optical axis meet all of the objects mentioned above and also have the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A measuring apparatus for adjusting an optical axis of a headlight comprising:

a first screen disposed in front of the headlight;

a camera for picturing an illuminating pattern which appears on the first screen; and an image sensing means for sensing that image of an imaginary light source which is formed on a reflecting mirror of the headlight.

2. A measuring apparatus according to claim 1, wherein said image sensing means comprises a light-shielding panel which is disposed in front of the headlight and which has a pin hole, a second screen to which is projected that light from the headlight which has penetrated through the pin hole, and a device for sensing an image on the second screen.

3. A measuring apparatus according to claim 2, wherein:

said second screen is disposed on a surface behind the light-shielding panel; and said apparatus further comprises a mirror for reflecting the light which has penetrated through the pin hole back to the second screen.

4. A measuring apparatus according to claim 3, wherein:
said first screen is constituted by a semitransparent screen which is disposed on substantially the same plane as said light-shielding panel;
said camera is disposed behind said first screen such that both said first screen and said second screen fall within a field of view of said camera, whereby said camera serves also the function of said device for sensing the image on said second screen.

5. A method of adjusting an optical axis by using a measuring apparatus comprising a first screen disposed in front of the headlight, a camera for picturing an illuminating pattern which appears on said first screen, and an image sensing means for sensing that image of an imaginary light source which is formed on a reflecting mirror of the headlight, said method comprising the steps of:

measuring a position of the headlight from a position of an imaginary light source image which is sensed by said image sensing means;

correcting an acceptable range within which falls a measuring reference point which is measured by an illuminating pattern on said first screen and which has a certain correlation with the optical axis of the headlight; and adjusting the optical axis such that the measuring reference point falls within the acceptable range.

6. A method of adjusting an optical axis by using a measuring apparatus comprising a first screen disposed in front of the headlight, a camera for picturing an illuminating pattern which appears on said first screen, and an image sensing means for sensing that image of an imaginary light source which is formed on a reflecting mirror of the headlight, said method comprising the steps of:

measuring a position of the headlight from a position of an imaginary light source image which is sensed by said image sensing means;

correcting an acceptable range within which falls a measuring reference point which is measured by an illuminating pattern on said first screen and which has a certain correlation with the optical axis of the headlight;

roughly adjusting the optical axis of the headlight such that the measuring reference point falls within a target range; and finely adjusting the optical axis of the headlight such that the imaginary light source image becomes a normal shape.

7. A method of adjusting an optical axis of a headlight comprising the steps of: sensing by an image sensing means that image of an imaginary light source which is formed on a reflecting mirror of the headlight; and adjusting the optical axis of the headlight such that the imaginary light source image becomes a normal shape.

* * * * *